United States Patent [19]

Heuer et al.

[11] 4,196,765
[45] Apr. 8, 1980

[54] VEHICLE WHEEL WITH DETACHABLE RIM RING

[75] Inventors: Herbert Heuer; Hans Käfer; Manfred Kunz, all of Korbach, Fed. Rep. of Germany

[73] Assignee: Continental Gummi-Werke Aktiengesellschaft, Hanover, Fed. Rep. of Germany

[21] Appl. No.: 882,433

[22] Filed: Mar. 1, 1978

[30] Foreign Application Priority Data

Mar. 3, 1977 [DE] Fed. Rep. of Germany ....... 2709160

[51] Int. Cl.² .............................................. B60C 5/16
[52] U.S. Cl. ................................................. 152/405
[58] Field of Search ........ 152/396, 397, 399, 405–415, 152/427, 428; 301/35 R, 63 D

[56] References Cited

U.S. PATENT DOCUMENTS

| 1,486,174 | 3/1924 | Williams | 152/406 X |
| 2,553,891 | 5/1951 | Brosick | 301/63 D X |
| 3,024,830 | 3/1962 | Bowersox | 152/396 |
| 3,882,919 | 5/1975 | Sons, Jr. et al. | 152/405 X |
| 4,043,374 | 8/1977 | Smith | 301/63 D X |

FOREIGN PATENT DOCUMENTS

| 578698 | 6/1933 | Fed. Rep. of Germany | 152/410 |
| 152897 | 6/1937 | Fed. Rep. of Germany | 152/399 |

Primary Examiner—Joseph F. Peters, Jr.
Assistant Examiner—D. W. Underwood
Attorney, Agent, or Firm—Becker & Becker

[57] ABSTRACT

A vehicle wheel having a detachable rim ring with a rim flange. The fastening means for the rim ring may be covered by a detachable plate which also seals off an air duct which leads to the hollow interior of the tire.

3 Claims, 2 Drawing Figures

VEHICLE WHEEL WITH DETACHABLE RIM RING

The present invention relates to a vehicle wheel having a detachabe rim ring with a rim flange.

The wheel bodies required for such wheels are dangerous because, with pneumatic tires which are still under internal pressure, the rim ring can be laterally thrown out with great force if the mounting or fastening elements for the rim ring are loosened.

It is therefore essentially an object of the present invention to design the wheel body or the rim which forms the wheel body in such a way that the pressure of the pneumatic tire is relieved when the rim ring is loosened.

Figure 1:
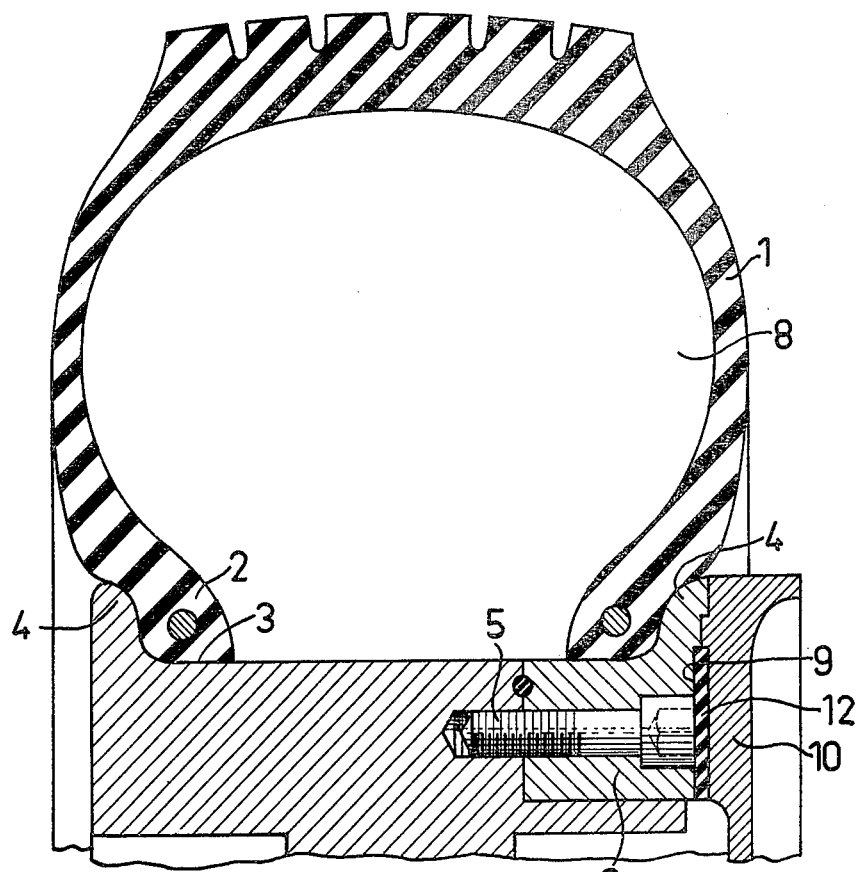
Figure 2:
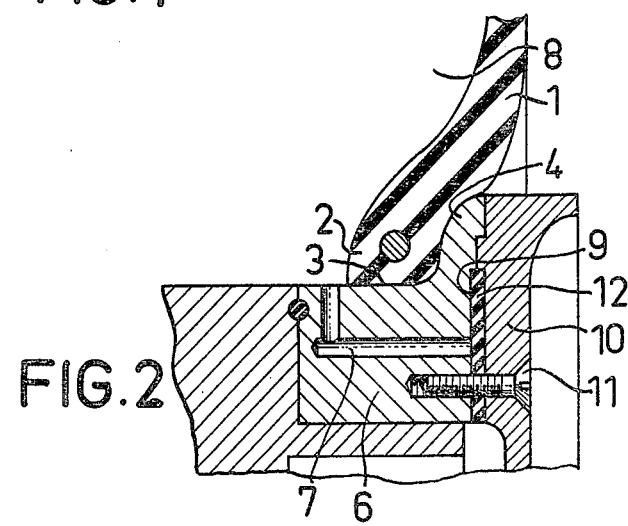

This object and other objects and advantages of the present invention will appear more clearly from the following specification in connection with the accompanying drawing, in which:

FIG. 1 is a radial section through a part of a vehicle wheel which has a pneumatic tire mounted thereon; and FIG. 2 is a radial section through the wheel of FIG. 1 but taken at a different place along the periphery of the wheel.

The vehicle wheel of the present invention is characterized primarily in that the fastening or mounting means for the rim ring may be covered by a detachable plate which also seals off an air duct which leads into the hollow interior of the tire.

Accordingly, the fastening means for the rim ring are not immediately accessible. Rather, to remove the rim ring, the referenced plate must first be removed. The plat, in turn, frees an air duct for the hollow interior of the tire. With the loosening of the plate, therefore, the pressure in the tire is relieved and, in this state, a fastening means for the rim ring can also be operated.

The pneumatic tire 1, which is essentially comprised of rubber or rubberlike material, rests with its beads 2 on seats 3 which are formed laterally inwardly of a rim flange 4.

On one side of the vehicle wheel is located a rim ring 6 which is mounted or fastened by screws or bolts 5. The rim ring 6 is removed or attached to the vehicle wheel for mounting and demounting a tire respectively.

At one or more places, the rim ring 6 is provided with an air duct 7 which leads from the hollow interior 8 of the tire, which interior 8 is under pressure during operation, to the laterally outwardly lying surfaces 9 of the rim ring 6. The laterally outwardly lying mouth of the duct 7, as well as the screws 5, are covered by a flat ring or plate 10 which in turn is detachably held by screws or bolts 11. Between the surface 9 and the plate 10 is located a sealing or gasket plate 12.

In order to demount the pneumatic tire 1, the screws 11 are first loosened, as a result of which air is released from the hollow interior 8 of the tire by means of the duct 7. With the removal of the ring 10, the screws 5 also become accessible, so that these screws 5 can now be operated.

In this way it is possible to remove the rim ring 6 from pneumatic tires 1 which are under pressure, i.e., inflated.

In place of the sealing plate 12, valves or other devices actuated from the plate 10 can also be provided.

Naturally, the tubeless mounted tire can be pressurized by a special valve which is not shown in the drawing.

The present invention is of course in no way limited to the specific showing of the drawing, but also encompasses any modifications within the scope of the appended claims.

What is claim is:

1. A vehicle wheel for supporting a pneumatic tire having a hollow interior, comprising in combination:
   a wheel body having a first rim flange;
   a rim ring detachably mounted on that side of said wheel body which is axially opposite said first rim flange, said rim ring being provided with a second rim flange and with means forming an air duct, said air duct extending through said rim ring for establishing direct venting communication between the hollow interior of said tire and the atmosphere;
   fastening means extending through said rim ring and into said wheel body for effecting said detachable mounting of said rim ring on said wheel body; and
   detachable plate means and attachment means, said attachment means extending through said plate means and into said rim ring to secure said plate means to said ring member whereby said plate means simultaneously covers said fastening means and directly seals off said air duct from the atmosphere.

2. A vehicle wheel in combination according to claim 1, in which said plate means and said rim ring are correspondingly annularly shaped with regard to each other.

3. A vehicle wheel in combination according to claim 1, which includes a gasket plate sealingly interposed between said rim ring and said plate means.